(12) United States Patent  (10) Patent No.: US 10,160,501 B1
Nania et al.  (45) Date of Patent: Dec. 25, 2018

(54) ROOF PANEL REINFORCEMENT

(71) Applicant: Ford Global Technologies, LLC, Dearborn, MI (US)

(72) Inventors: Adrian Nania, Rochester, MI (US); Michael Joseph Lee, Ann Arbor, MI (US)

(73) Assignee: Ford Global Technologies, LLC, Dearborn, MI (US)

( * ) Notice: Subject to any disclaimer, the term of this patent is extended or adjusted under 35 U.S.C. 154(b) by 0 days.

(21) Appl. No.: 15/871,195

(22) Filed: Jan. 15, 2018

(51) Int. Cl.
| | | |
|---|---|---|
| *B62D 25/06* | (2006.01) | |
| *B62D 27/02* | (2006.01) | |
| *B62D 25/04* | (2006.01) | |
| *B60J 7/043* | (2006.01) | |

(52) U.S. Cl.
CPC .......... *B62D 25/06* (2013.01); *B62D 27/023* (2013.01); *B60J 7/043* (2013.01); *B62D 25/04* (2013.01)

(58) Field of Classification Search
CPC ...... B62D 25/06; B62D 27/02; B62D 27/026; B62D 27/023; B60J 7/043

USPC .............. 296/210, 203.01, 203.03, 216.01
See application file for complete search history.

(56) References Cited

U.S. PATENT DOCUMENTS

| | | | | |
|---|---|---|---|---|
| 5,018,781 | A * | 5/1991 | Kumasaka | B62D 25/06 296/193.03 |
| 7,077,462 | B1 * | 7/2006 | De Gaillard | B60J 7/022 296/193.04 |
| 7,097,225 | B2 | 8/2006 | Huisingh et al. | |
| 7,914,072 | B2 | 3/2011 | Queener et al. | |
| 8,827,347 | B2 | 9/2014 | Snider | |
| 8,899,671 | B2 | 12/2014 | Huelke | |
| 2013/0207420 | A1 | 8/2013 | Kumar et al. | |

* cited by examiner

*Primary Examiner* — Dennis H Pedder
(74) *Attorney, Agent, or Firm* — Brooks Kushman P.C.

(57) ABSTRACT

A vehicle includes a lower roof bow and an integrally-formed roof panel. The lower roof bow extends transversely between roof rails and defines a lower channel wall. The integrally-formed roof panel has longitudinal rails and an upper roof bow. The longitudinal rails extend parallel to the roof rails. The upper roof bow is secured to the lower roof bow. The upper roof bow includes an upper channel wall having an interior surface and an exterior surface. The interior surface is spaced from the lower channel wall to define a channel therebetween. The exterior surface defines an exterior surface of the vehicle.

18 Claims, 4 Drawing Sheets

ROOF PANEL REINFORCEMENT

TECHNICAL FIELD

This disclosure relates to roof panel reinforcement, and more particularly, to a roof panel having an integrated roof bow structure.

BACKGROUND

Roof bows are attached to vehicle roof structures to strengthen the roof assembly and support the roof rails and roof panel. Roof support pillars are typically located between the windows and doors of a vehicle. Roof support pillars are frequently identified as A, B, C and in some instances D-Pillars depending on the vehicle style. A B-Pillar is generally located immediately behind the front door of a vehicle and is traditionally used to mount the rear door hinges and associated rear doors. The B-Pillar often plays an important role in determining roof strength and the degree of side impact intrusion.

Vehicles often include moonroofs and sunroofs. In these vehicle, the B-Pillar roof bow typically omitted. Such vehicles must still adhere to certain strength requirements and moonroof assemblies must make up for the lack of support caused by the missing B-Pillar roof bow.

SUMMARY

In at least one approach, a vehicle is provided. The vehicle may include a plurality of roof rails extending longitudinally along the vehicle. The vehicle may also include a lower roof bow extending transversely across the vehicle between the roof rails. The lower roof bow may be formed of a first sheet and defining a first set of transverse mating surfaces and a lower channel wall extending between the first set of transverse mating surfaces. The vehicle may further include a moonroof assembly including a moonroof and a moonroof housing supporting the moonroof. The moonroof housing may be integrally-formed of a second sheet and may define opposing longitudinal rails and an upper roof bow extending transversely between the longitudinal rails. The longitudinal rails may extend parallel to the roof rails. The upper roof bow may define a second set of transverse mating surfaces secured to the first set of transverse mating surfaces, and an upper channel wall extending between the second set of transverse mating surfaces such that the upper channel wall is spaced opposite the lower channel wall to define a roof bow channel therebetween.

In at least one approach, a vehicle may include a lower roof bow and an integrally-formed roof panel. The lower roof bow may extend transversely between roof rails and may define a lower channel wall. The integrally-formed roof panel may have longitudinal rails and an upper roof bow. The longitudinal rails may extend parallel to the roof rails. The upper roof bow may be secured to the lower roof bow. The upper roof bow may include an upper channel wall having an interior surface and an exterior surface. The interior surface may be spaced from the lower channel wall to define a channel therebetween. The exterior surface may define an exterior surface of the vehicle.

In at least one approach, a method for assembling a vehicle is provided. The method may include securing an upper roof bow portion of a roof assembly to a lower roof bow. The upper roof bow portion may include transversely-extending planar mating surfaces engaging the lower roof bow and an inverse-U channel wall extending therebetween. The inverse-U channel wall may have an interior surface spaced from the lower roof bow to define a substantially-hollow channel therebetween. The inverse-U channel wall may also have an exterior surface defining an exterior surface of the vehicle.

DETAILED DESCRIPTION

Embodiments of the present disclosure are described herein. It is to be understood, however, that the disclosed embodiments are merely examples and other embodiments may take various and alternative forms. The figures are not necessarily to scale; some features could be exaggerated or minimized to show details of particular components. Therefore, specific structural and functional details disclosed herein are not to be interpreted as limiting, but merely as a representative basis for teaching one skilled in the art to variously employ the present invention. As those of ordinary skill in the art will understand, various features illustrated and described with reference to any one of the figures may be combined with features illustrated in one or more other figures to produce embodiments that are not explicitly illustrated or described. The combinations of features illustrated provide representative embodiments for typical applications. Various combinations and modifications of the features consistent with the teachings of this disclosure, however, could be desired for particular applications or implementations.

Figure 1:
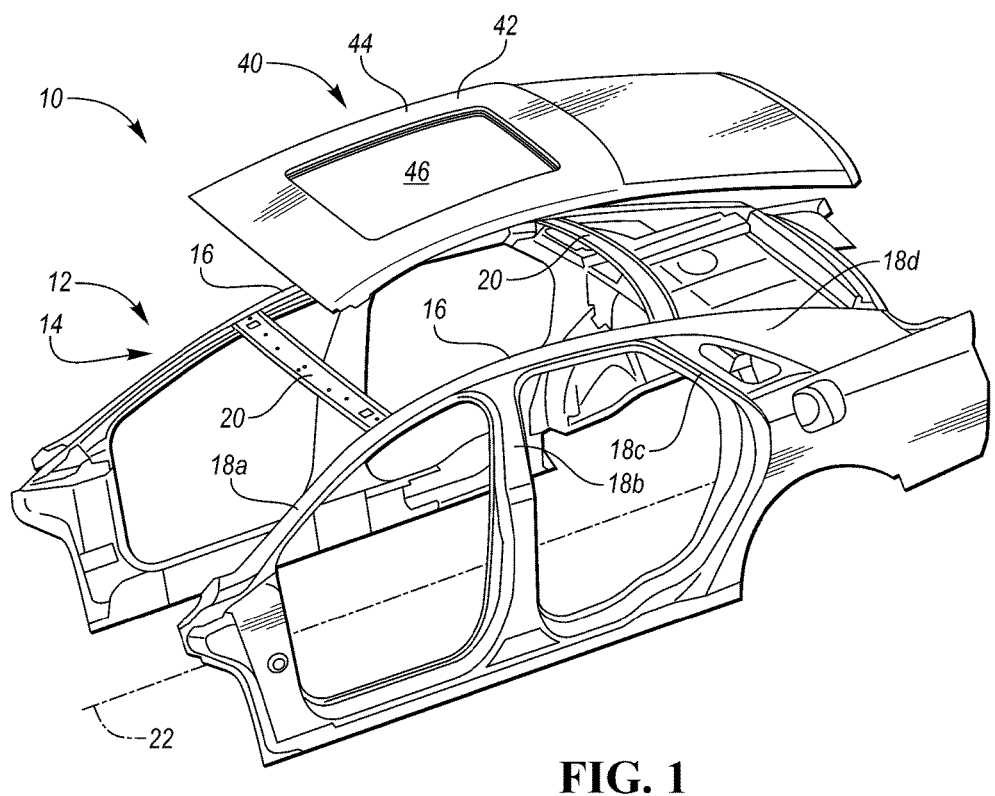
FIG. 1 is a partially exploded perspective view of a vehicle body structure.

For purposes of description herein, the terms "upper," "lower," "right," "left," "rear," "front," "vertical," "horizontal," and derivatives thereof shall relate to the invention as oriented in FIG. 1. However, it is to be understood that the disclosure may assume various alternative orientations, except where expressly specified to the contrary.

Referring now to FIG. 1, a vehicle 10 may include a vehicle body structure 12. The vehicle body structure 12 may be the body shell of the vehicle. The vehicle body structure 12 may be the skeletal structure to which various subsystems may be subsequently attached. In the approach shown, the vehicle body structure 12 may be a car body structure. However, other body structures, such as truck body structures, are contemplated. The vehicle body structure 12 may also be a common or shared vehicle platform suitable for various powertrains. For example, a given vehicle body structure 12 may be used for both common internal combustion engine powertrains and alternate powertrains such as diesel or hybrid electric vehicles.

The vehicle body structure 12 may include a roof support assembly 14. The roof support assembly 14 may include roof rails 16 and support pillars 18 (e.g., A-Pillars 18a, B-Pillars 18b, C-Pillars 18c, and D-Pillars 18d) extending to the roof rails 16. The roof rails 16 may extend longitudinally along the vehicle body structure 12 of the vehicle 10.

The roof support assembly 14 may also include one or more lower roof bows 20 extending between the roof rails 16. For example, the lower roof bows 20 may extend transversely relative to a longitudinal axis 22 of the vehicle body structure 12. a lower roof bow 20 may be formed of a single sheet. The single sheet may be, for example, a stamped sheet. The lower roof bows 20 may be formed, for example, of extruded aluminum and may have 2.0 mm-3.0 mm thick walls. In still another approach, a lower roof bow may be an assembly of multiple sheets.

The lower roof bows 20 may be secured directly or indirectly to the roof rails 16. In at least one approach, the roof bows 20 may extend between handoff brackets or side brackets that may be secured, for example, to the roof rails 16 or pillars 18. The handoff brackets may be formed of aluminum, stamped high strength steel, or other suitable material. The handoff brackets may be fastened to the roof rails 16 or pillars 18 using any suitable fastener, such as rivets (e.g., self-piercing rivets), nuts and bolts, or a combination thereof. In still another approach, the roof bows 20 may be secured directly to the roof rails 16.

Figure 2:
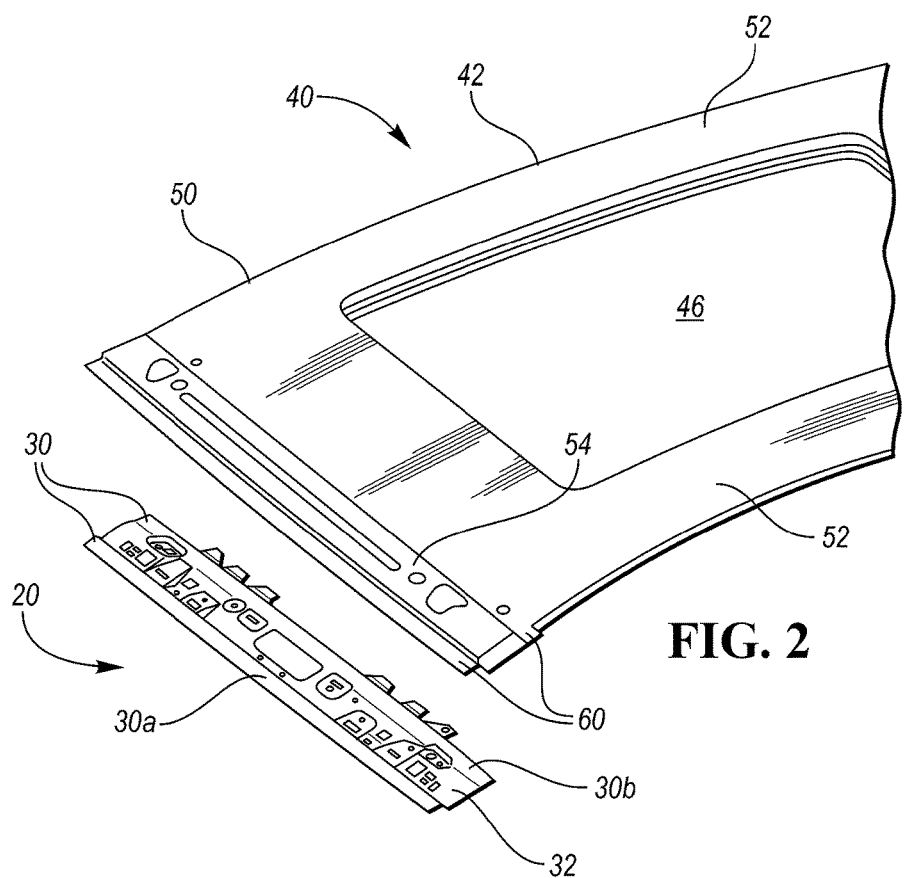
FIG. 2 is a partial upper perspective view of a moonroof assembly and a lower roof bow.

Referring to FIG. 2, the lower roof bow 20 may define a set of transverse mating surfaces 30. For example, the lower roof bow 20 may define a forward mating surface 30a and a rear mating surface 30b. The transverse mating surfaces 30 (which may be referred to as a first set of transverse mating surfaces 30) may be substantially planar mating surfaces. The transverse mating surfaces 30 may extend along an entire length of the lower roof bow 20, or along less than an entire length of the lower roof bow 20. In at least one approach, the transverse mating surfaces 30 are continuous mating surfaces. In at least another approach, the transverse mating surfaces 30 are discontinuous mating surfaces.

The lower roof bow 20 may further define a lower channel wall 32. The lower channel wall 32 may extend between the first set of transverse mating surfaces 30 (e.g., between the forward mating surface 30a and a rear mating surface 30b). The lower channel wall 32 may extend along an entire length of the lower roof bow 20, or along less than an entire length of the lower roof bow 20. In at least one approach, the lower channel wall 32 is a continuous channel wall. In at least another approach, the lower channel wall 32 is a discontinuous channel wall (e.g., having apertures disposed therethrough).

The vehicle structure 10 may further include a roof assembly 40. The roof assembly 40 may include a roof panel 42. In at least one approach, an exterior surface of the roof panel 42 defines an exterior surface of the vehicle structure 10. In this way, the roof panel 42 may receive a final finish and paint coating.

In at least one approach, the vehicle structure 10 has a moonroof (or sunroof) window. In this way, the roof assembly 40 may include a moonroof assembly 44. The moonroof assembly 44 may include a moonroof 46. The moonroof assembly 44 may also include a moonroof housing 50 for supporting the moonroof 46.

Figure 3:
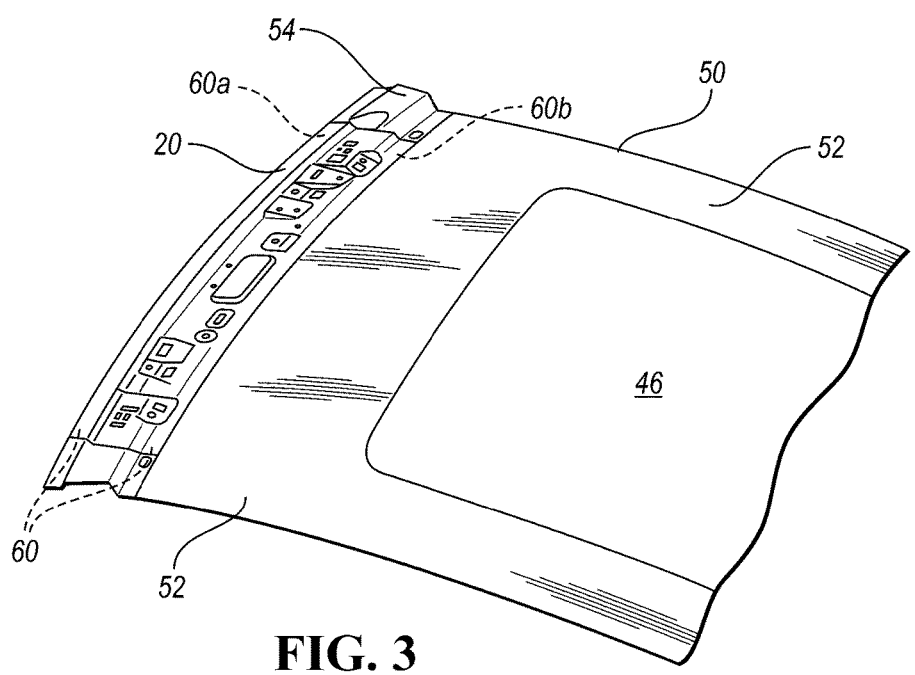
FIG. 3 is a partial lower perspective view of a moonroof assembly and a lower roof bow.

Referring to FIGS. 2 and 3, the moonroof housing 50 may be integrally-formed of a sheet of material. The moonroof housing 50 may define various regions or portions of the integrally-formed body. For example, the integrally-formed moonroof housing 50 may define opposing longitudinal rails 52 and an upper roof bow 54. The longitudinal rails 52 may extend parallel to the roof rails 16, and the upper roof bow 54 may extend transversely between the longitudinal rails 52. As shown in FIG. 3, the upper roof bow 54 may have a length (e.g., in a direction orthogonal to the longitudinal axis 22) that is greater than a length of the lower roof bow 20.

Referring to FIG. 3, the upper roof bow 54 may define a set of transverse mating surfaces 60. For example, the upper roof bow 54 may define a forward mating surface 60a and a rear mating surface 60b. The transverse mating surfaces 60 (which may be referred to as a second set of transverse mating surfaces 60) may be substantially planar mating surfaces. The transverse mating surfaces 60 may extend along an entire length of the upper roof bow 54, or along less than an entire length of the upper roof bow 54. In at least one approach, the transverse mating surfaces 60 are continuous mating surfaces. In at least another approach, the transverse mating surfaces 60 are discontinuous mating surfaces.

The upper roof bow 54 may further define an upper channel wall 62. The upper channel wall 62 may extend between the second set of transverse mating surfaces 60 (e.g., between the forward mating surface 60a and a rear mating surface 60b). The upper channel wall 62 may extend along an entire length of the upper roof bow 54, or along less than an entire length of the upper roof bow 54. In at least one approach, the upper channel wall 62 is a continuous channel wall. In at least another approach, the upper channel wall 62 is a discontinuous channel wall (e.g., having apertures disposed therethrough).

Figure 5:
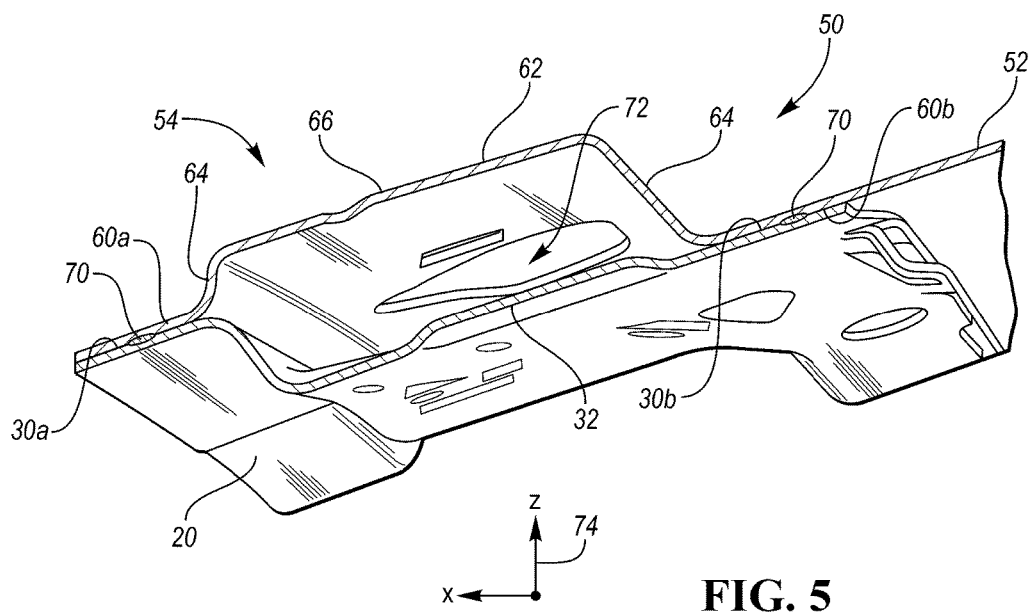
FIG. 5 is an enlarged view of a portion of FIG. 4.

As best shown in FIG. 5, the upper channel wall 62 may include opposing sidewalls 64 extending from the transverse mating surfaces 60. The opposing sidewalls 64 may extend in a direction away from the lower roof bow 20. An intermediate wall 66 may extend between the opposing sidewalls 64. The intermediate wall 66 may be a generally planar intermediate wall. As shown, the geometry of the upper channel wall 62, including the opposing sidewalls 64 and the intermediate wall 66 may define a cross-section defining a generally inverted-U.

Figure 4:
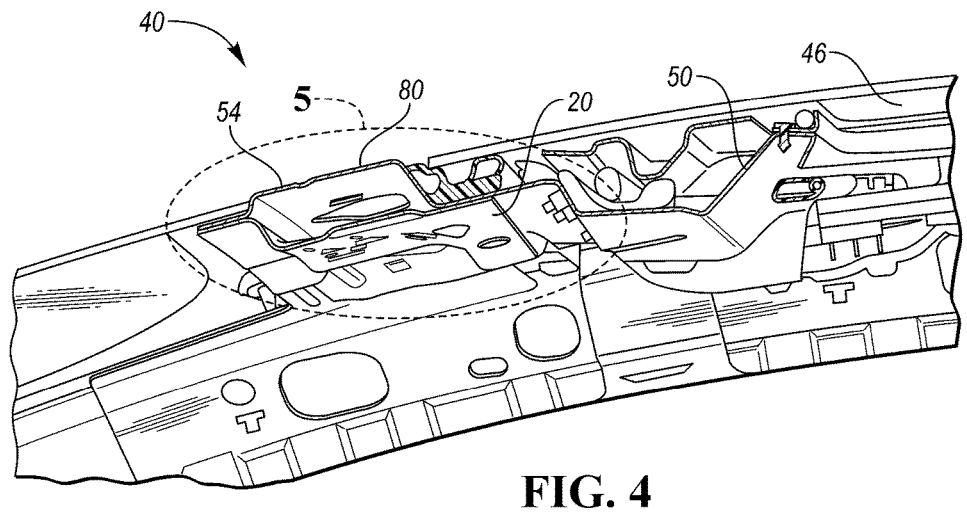
FIG. 4 is a partial cross-section view taken along line 4-4 of FIG. 1.

As shown in FIGS. 4 and 5, the moonroof housing 50 may be secured to the lower roof bow 20. For example, the transverse mating surfaces 60 of the upper roof bow 54 may be secured to the transverse mating surfaces 30 of the lower roof bow 20. In at least one approach, adhesive 70 may be disposed between the first and second sets of transverse mating surfaces 30, 60 to secure the upper roof bow 54 to the lower roof bow 20. In still another approach, a mechanical fastener may be used to secure the upper roof bow 54 to the lower roof bow 20. In still another approach, the upper roof bow 54 may be welded to the lower roof bow 20.

In the assembled configuration, the upper channel wall 62 may be spaced opposite the lower channel wall 32 to define a roof bow channel therebetween. In at least one approach, an inner surface of at least a portion of the intermediate wall 66 of the upper channel wall 62 may be spaced at least 50 millimeters from a portion of the lower channel wall 32. For example, the intermediate wall 66 may be spaced from the lower roof bow 20 at a central transverse region of the may be vehicle 10 (e.g., at a midpoint of the upper roof bow 54). The spacing may be measured, for example, at opposing surfaces disposed opposite along a vertical axis (e.g., extending orthogonal to the longitudinal axis 22).

In this way, the upper roof bow 54 and the lower roof bow 20 may define a roof bow channel 72 therebetween. The roof bow channel 72 may be hollow in at least one plane 74 extending through a cross-section of the lower roof bow 20 and the upper roof bow 54. In at least one approach, the upper roof bow 54 and the lower roof bow 20 may define a roof bow channel 72 that is substantially hollow along a transverse length of the roof bow channel 72.

In this way, the lower roof bow 20 and the upper roof bow 54 may define a roof bow channel 72 having an increased cross-sectional height. The upper roof bow 54, together with the lower roof bow 20, may be adapted to transfer a torsion force between the roof rails 16. The increased cross-sectional height may increase vehicle torsion. The increased cross-sectional height may also increase roof crush strength.

Referring again to FIG. 4, in at least one approach, at least a portion of the intermediate wall 66 may define an exterior surface 80 of the vehicle 10. More particularly, the exterior surface 80 may be a surface that is visible and/or physically engageable from an exterior of the vehicle 10. In this way, the exterior surface 80 may include a Class A surface finish; for example, a film, a paint, or both.

The lower roof bow 20 and the upper roof bow 54 of the moonroof housing 50 may be disposed at a forward region of the vehicle 10. In still another approach, lower roof bow 20 and the upper roof bow 54 of the moonroof housing 50 may be disposed at a rear region of the vehicle 10. In still another approach, a lower roof bow 20 may be disposed at a forward region of the vehicle 10 and at a rear region of the vehicle 10. The moonroof housing 50 may include a first upper roof bow 54 disposed opposite a lower roof bow 20 at a forward region of the vehicle 10, and a second upper roof bow 54 disposed opposite a lower roof bow 20 at a rear region of the vehicle 10. The second roof bow 54 may be formed as discussed herein, and may be secured to the lower roof bow 20 as also discussed herein.

In at least one approach, a method for assembling a vehicle is provided. The method may include securing an upper roof bow portion of a roof assembly to a lower roof bow. The upper roof bow portion may include transversely-extending planar mating surfaces engaging the lower roof bow and an inverse-U channel wall extending therebetween. The inverse-U channel wall may have an interior surface spaced from the lower roof bow to define a substantially-hollow channel therebetween. The inverse-U channel wall may also have an exterior surface defining an exterior surface of the vehicle.

Figure 6:
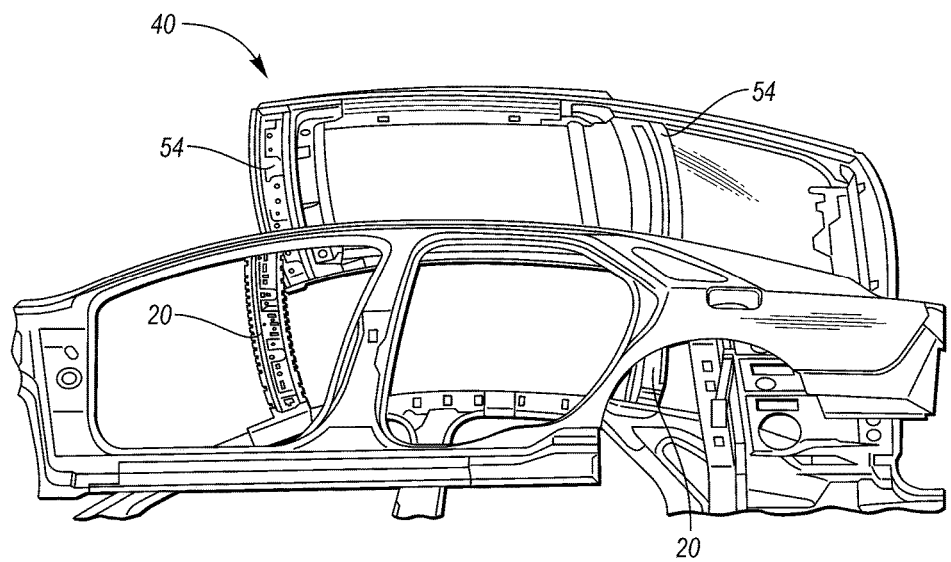
FIG. 6 depicts an assembly of a vehicle body structure according to at least one approach.

Referring to FIG. 6, the method may include securing the lower roof bow to a handoff bracket secured to a roof rail of the vehicle prior to securing the roof assembly to the lower roof bow.

Figure 7:
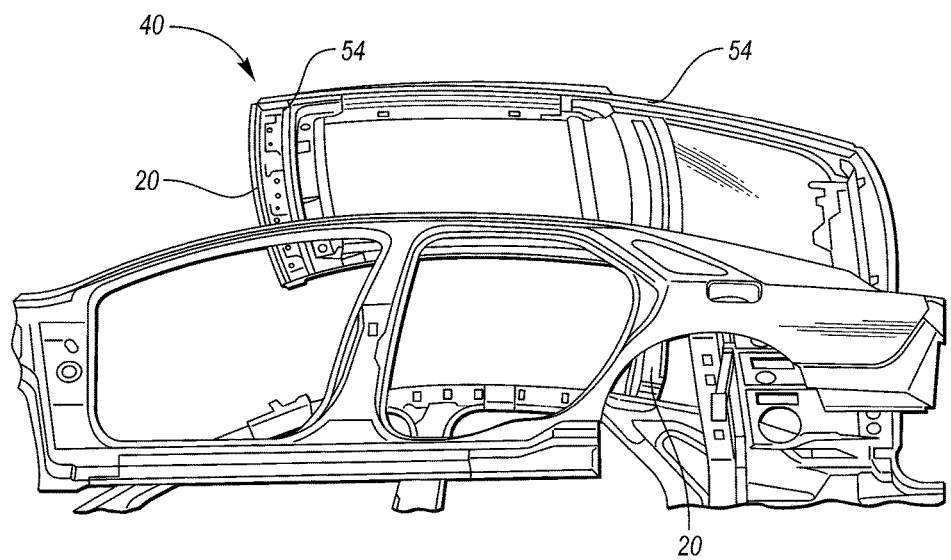
FIG. 7 depicts an assembly of a vehicle body structure according to at least another approach.

Referring to FIG. 7, the method may include securing the lower roof bow to a handoff bracket secured to a roof rail of the vehicle after securing the roof assembly to the lower roof bow. Although shown with a rear lower roof bow secured to a roof rail of the vehicle prior to securing the roof assembly to the lower roof bow, it is expressly contemplated that both a forward and rear lower roof bow may be secured to a handoff bracket after securing the lower roof bows to the roof assembly.

While exemplary embodiments are described above, it is not intended that these embodiments describe all possible forms encompassed by the claims. The words used in the specification are words of description rather than limitation, and it is understood that various changes may be made without departing from the spirit and scope of the disclosure. As previously described, the features of various embodiments may be combined to form further embodiments of the invention that may not be explicitly described or illustrated. While various embodiments could have been described as providing advantages or being preferred over other embodiments or prior art implementations with respect to one or more desired characteristics, those of ordinary skill in the art recognize that one or more features or characteristics may be compromised to achieve desired overall system attributes, which depend on the specific application and implementation. These attributes may include, but are not limited to cost, strength, durability, life cycle cost, marketability, appearance, packaging, size, serviceability, weight, manufacturability, ease of assembly, etc. As such, embodiments described as less desirable than other embodiments or prior art implementations with respect to one or more characteristics are not outside the scope of the disclosure and may be desirable for particular applications.

What is claimed is:

1. A vehicle comprising:
   a plurality of roof rails extending longitudinally along the vehicle;
   a lower roof bow extending transversely across the vehicle between the roof rails, the lower roof bow formed of a first sheet and defining a first set of transverse mating surfaces and a lower channel wall extending between the first set of transverse mating surfaces; and
   a moonroof assembly including
      a moonroof, and
      a moonroof housing supporting the moonroof, the moonroof housing integrally-formed of a second sheet defining opposing longitudinal rails and an upper roof bow extending transversely between the longitudinal rails, wherein the longitudinal rails extend parallel to the roof rails, and wherein the upper roof bow defines a second set of transverse mating surfaces secured to the first set of transverse mating surfaces, and an upper channel wall extending between the second set of transverse mating surfaces such that the upper channel wall is spaced opposite the lower channel wall to define a roof bow channel therebetween.

2. The vehicle of claim 1 wherein the roof bow channel is hollow in at least one plane extending through a cross-section of the lower roof bow and the upper roof bow.

3. The vehicle of claim 2 wherein the roof bow channel is substantially hollow along a transverse length of the roof bow channel.

4. The vehicle of claim 1 wherein the first and second sets of transverse mating surfaces are substantially planar mating surfaces.

5. The vehicle of claim 1 wherein the upper channel wall includes opposing sidewalls extending from the second set of transverse mating surfaces in a direction away from the lower roof bow.

6. The vehicle of claim 5 wherein a generally planar intermediate wall extends between the opposing sidewalls.

7. The vehicle of claim 6 wherein the intermediate wall and the opposing sidewalls have a cross-section defining a generally inverted-U.

8. The vehicle of claim 6 wherein the intermediate wall is spaced at least 50 millimeters from the lower channel wall.

9. The vehicle of claim 6 wherein at least a portion of the intermediate wall defines an exterior surface of the vehicle.

10. The vehicle of claim 9 wherein the exterior surface includes a Class A surface finish including at least one of a film or a paint.

11. The vehicle of claim 1 further comprising an adhesive disposed between the first and second sets of transverse mating surfaces to secure the upper roof bow to the lower roof bow, and wherein the mating surfaces are free of mechanical fasteners.

12. The vehicle of claim 1 wherein the upper roof bow is adapted to transfer a torsion force between the roof rails.

13. The vehicle of claim 1 wherein the vehicle further includes
   a rear lower roof bow extending transversely across the vehicle between the roof rails, the lower roof bow formed of a third sheet defining a third set of transverse mating surfaces and a rear lower channel wall extending between the third set of transverse mating surfaces, and wherein the moonroof housing integrally-formed of the second sheet further defines a rear upper roof bow defining a fourth set of transverse mating surfaces secured to the third set of transverse mating surfaces, and a rear upper channel wall extending between the fourth set of transverse mating surfaces such that the rear upper channel wall is spaced opposite the rear lower channel wall to define a rear roof bow channel therebetween.

14. A vehicle comprising:
a lower roof bow extending transversely between roof rails and defining a lower channel wall; and
an integrally-formed roof panel having
   longitudinal rails extending parallel to the roof rails, and
   an upper roof bow secured to the lower roof bow and including an upper channel wall having
      an interior surface spaced from the lower channel wall to define a channel therebetween, and
      an exterior surface defining an exterior surface of the vehicle.

15. The vehicle of claim 14 wherein the channel is hollow in at least one plane extending through a cross-section of the lower roof bow and the upper roof bow.

16. The vehicle of claim 14 wherein at least a portion of the interior surface is spaced at least 50 millimeters from the lower channel wall.

17. The vehicle of claim 14 wherein at least a portion of the exterior surface includes a Class A surface finish including at least one of a film or a paint.

18. A vehicle roof assembly method comprising:
securing an integrally-formed roof panel to a lower roof bow that extends transversely between roof rails, the integrally-formed roof panel having
   longitudinal rails extending parallel to the roof rails, and
   an upper roof bow portion that extends transversely between the longitudinal rails, the upper roof bow portion including transversely-extending planar mating surfaces engaging the lower roof bow and an inverse-U channel wall extending therebetween, the inverse-U channel wall having
      an interior surface spaced from the lower roof bow to define a substantially-hollow channel therebetween, and
      an exterior surface defining an exterior surface of a vehicle.

* * * * *